United States Patent

Chung et al.

[11] Patent Number: 5,554,419
[45] Date of Patent: Sep. 10, 1996

[54] LIQUID CRYSTAL DISPLAY DEVICE

[75] Inventors: Seong-eun Chung, Seoul; Jong-cheon Lee, Suwon, both of Rep. of Korea

[73] Assignee: Samsung Display Devices Co., Ltd., Kyungki-Do, Rep. of Korea

[21] Appl. No.: 574,581

[22] Filed: Dec. 14, 1995

Related U.S. Application Data

[63] Continuation of Ser. No. 366,091, Dec. 29, 1994, abandoned.

[30] Foreign Application Priority Data

May 31, 1994 [KR] Rep. of Korea .................. 94-12219

[51] Int. Cl.$^6$ .................................................. G02F 1/1337
[52] U.S. Cl. .................................................. 428/1; 359/75
[58] Field of Search .............................. 428/1; 359/75–79

[56] References Cited

U.S. PATENT DOCUMENTS

| | | | |
|---|---|---|---|
| 4,240,710 | 12/1980 | Kozaki et al. | 350/339 R |
| 4,796,979 | 1/1989 | Tsuboyama | 350/350 S |
| 5,173,342 | 12/1992 | Sato et al. | 359/75 |
| 5,330,803 | 7/1994 | Takao et al. | 359/75 |

FOREIGN PATENT DOCUMENTS

| | | |
|---|---|---|
| 0545733 | 6/1993 | European Pat. Off. . |
| 1583176 | 1/1981 | United Kingdom . |

*Primary Examiner*—Alexander Thomas
*Attorney, Agent, or Firm*—Rothwell, Figg, Ernst & Kurz, P.C.

[57] ABSTRACT

A liquid crystal display device includes a pair of substrates, a pair of transparent electrodes formed on the substrates, a pair of orientation layers consisting of at least two coating layers formed on the transparent electrode and a liquid crystal material layer, to thereby reduce a defect rate due to rubbing. Since two or more orientation materials having different pre-tilt angles are used, control of the pre-tilt angle is advantageous so that a disinclination defect generated when voltage is applied can be removed. The liquid crystal orientation is stable and uniform.

12 Claims, 5 Drawing Sheets

LIQUID CRYSTAL DISPLAY DEVICE

This is a continuation of application Ser. No. 08/366,091, filed Dec. 29, 1994 now abandoned.

FIELD OF THE INVENTION

The present invention relates to a liquid crystal display device and particularly to a liquid crystal display device having a multi-coating orientation layer composed of an under-coating orientation layer on a transparent electrode on a substrate and at least one over-coating layer made of a material having a different orientation on the under-coating orientation layer.

BACKGROUND OF THE INVENTION

Generally, liquid crystal is easily influenced by external stimulation such as an electric field, a magnetic field, stress, etc. As a result of this characteristic, the liquid crystals can be applied to a light shutter and even to a display device.

In order to utilize this characteristic of liquid crystal, the liquid crystal molecule can be moved as desired according to the change of the external environment. Therefore, the uniform orientation of the liquid crystal is important.

An organic layer coated and orientation treated on the transparent electrode interacts physicochemically with liquid crystal by the bonding energy such as van der Waals force, attraction between dipoles, hydrogen bonding, etc. This is known to be the main factor of liquid crystal orientation (see "Liquid Crystal Application and Uses," Vol. 3, 1992, World Scientific Publishing Co.). In addition, micro-grooves formed on the organic layer during rubbing using a rubbing cloth are another factor of liquid crystal orientation.

In order to orient liquid crystalline material during the manufacture of the liquid crystal display device according to the conventional method, an organic layer, preferably a polyimide layer, is coated on the transparent electrode formed on the substrate. Then, the organic layer is rubbed using a cloth to orient the liquid crystal molecule to the rubbing direction or perpendicular thereto (Japanese Patent Laid-open Publication No. sho 63-14122). However, the organic layer is damaged by the rubbing cloth during the rubbing treatment which induces nonuniform orientation of the liquid crystal and causes other defects which adversely affect the manufacture of the liquid crystal display device.

If the liquid crystal is injected after such mechanical rubbing, nonuniform orientation due to rubbing traces (i.e., variations in the size and depth of the grooves and other contaminant) is produced, which ultimately causes significant damage to the electric-optic effect of the liquid crystal. Here, bistability, which is a particularly important property of ferroelectric liquid crystal, becomes erratic and the memory characteristic of the liquid crystal is deteriorated (see Japanese Patent Laid-open Publication Nos. hei 1-155318, hei 1-281428 and hei 2-61614). In addition, dust produced after the mechanical rubbing reacts directly with the liquid crystal to break the orientation and to induce various other defects (see Japanese Patent Laid-open Publication Nos. sho 63-132220 and hei 3-59089).

Particularly, for the ferroelectric liquid crystal, the disruption of orientation is easily induced, even by a trivial defect. In this case, since good bistability cannot be easily obtained, a liquid crystal display device exhibiting good bistability characteristics cannot be easily manufactured.

SUMMARY OF THE INVENTION

An object of the present invention considering the above-mentioned problems is to provide a liquid crystal display device having a novel orientation layer called a "multi-coating orientation layer."

To accomplish the object, there is provided in the present invention a liquid crystal display device comprising a pair of substrates, a pair of transparent electrodes formed on the substrates, a pair of orientation layers coated and formed on the transparent electrodes and a liquid crystal material layer, characterized in that at least one of the orientation layers consists of two or more coating layers.

Preferably, the orientation layer is an organic layer consisting of two coating layers and an under-coating layer thereof is made of at least one compound selected from the group consisting of polyimide, polyvinyl alcohol, polyester and liquid crystalline polymer, or an inorganic material-deposited layer such as $SiO_x$ (wherein, x is 1 or 2).

Preferably, all the coating layers except the outermost coating layer are orientation-treated layers and the outermost layer is formed by polymer having liquid crystalline phase.

As for the liquid crystalline material which could be employed in the liquid crystal display device of the present invention, twisted nematic liquid crystal, super twisted nematic liquid crystal, ferroelectric liquid crystal, antiferroelectric liquid crystal, etc. may be used.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1A:
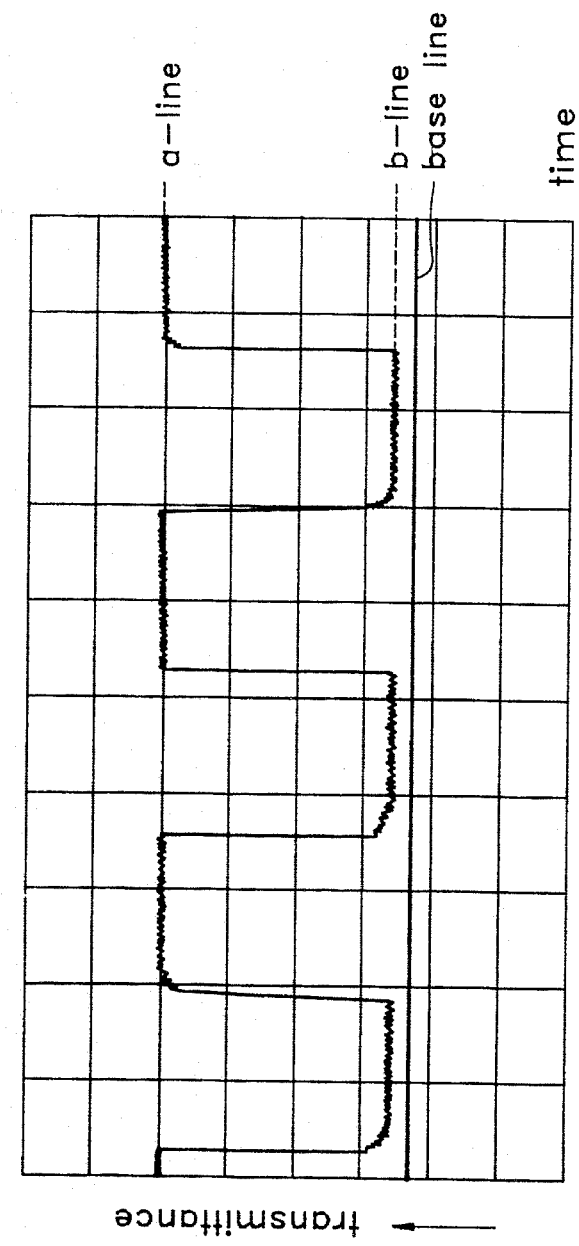
FIGS. 1A and 1B show an electro-optic characteristic of the liquid crystal display device manufactured by the conventional method.

The multi-coating orientation layer in the liquid crystal display device of the present invention is formed by the following principle. First, a conventional orientation material is coated and rubbed as in the conventional PI (polyimide) orientation method. Then, a material having good orientating characteristics such as liquid crystalline polymer is over-coated. Through the use of this overcoating, scratches, dust and other imperfections of the under-coating which are generated during rubbing can be covered by the over-coating. Also, since the molecules in the over-coating layer align along the micro-grooves on the undercoating, the liquid crystal molecules align uniformly. Accordingly, a liquid crystal display device having decreased defects due to the rubbing treatment and having uniformly aligned liquid crystal molecules is formed.

That is, micro-grooves on the orientation layer formed by the mechanical rubbing aligns liquid crystal as well as disrupts the alignment. When an organic layer is formed on the rubbed orientation layer, the over-coated organic layer aligns along the micro-grooves formed on the first coated orientation layer. Therefore, a defect-free, uniform alignment of liquid crystal including ferroelectric liquid crystal and good bistability can be obtained. At this time, liquid crystalline polymer which can be easily oriented is preferably used for forming the over-coating layer. However, the material for this layer is not limited to the liquid crystalline polymer.

Transparent electrode such as ITO (indium-tin oxide) is coated on the glass substrate. Then, an organic layer made of polyimide, polyvinyl alcohol, polyester, liquid crystalline polymer, etc. or inorganic layer made of using SiOx (wherein x is an integer of 1 or 2) is coated on the electrode. The coating layer is rubbed using a rubbing cloth such as nylon and rayon, diamond and various pastes. Thereafter, a material such as liquid crystalline polymer having a good orientating effect or an organic polymer having a long chain is over-coated and dried or cured. Spacers are sprayed on the coating layer to maintain a prescribed distance between two thus-treated substrates. Then, two substrates are joined and sealed. Liquid crystal such as twist nematic, super twist nematic, ferroelectric liquid crystal or antiferroelectric liquid crystal is injected into the space to form the liquid crystal display device of the present invention.

Though the orientation layer made of two coating layers of under-coating and one layer of over-coating is illustrated as the preferred embodiment, the over-coating could be carried out more than once and so that two or more over-coatings of different materials are possible, as desired.

If the orientation layer consists of a multi-coating layer, the adjacent coating layers are preferably made of different materials which are dissolved in different solvents, respectively, to prevent inter-layer affinity.

The material for the adjacent layer and coating order are appropriately selected considering the affinity between materials, ability of orienting the liquid crystal, the desired pre-tilt angle, etc. For example, a material having a strong pre-tilt characteristic but poor interaction with liquid crystal is employed as the under-coating, and then a material showing good interaction with liquid crystal though having a weak pre-tilt characteristic is used as the over-coating, to form a desirable device.

The examples of the present invention will be described in detail below.

EXAMPLE 1

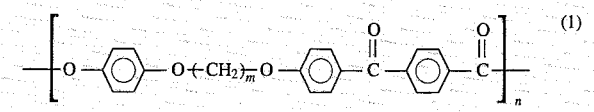

wherein m and n are integers greater than three.

Two glass substrates coated with ITO electrodes were cut in 76.2 mm×101.6 mm size and washed cleanly. A polyimide orienting agent (RN 305 manufactured by Nissan Chemical) as the under-coating orientating agent was dissolved in a solvent with the ratio of N-methyl pyrrolidone to butylcellosolve being 8:2 such that the amount of the solid material was 2 wt%. The solution was coated on the electrodes, respectively, at 4,000 rpm using a spin coating method and the coated layers were dried for 10 minutes at 120° C. to evaporate the solvent and cured at 260° C. for one hour. The cured coating layers were rubbed using a roller wrapped with rayon. A polyester liquid crystal polymer of a following structure formula (1) was dissolved in a solvent with the ratio of N-methyl pyrrolidone butylcellosolve being 8:2 such that the amount of the solid material was 1 wt% and coated on the rubbed under-coating layers at 3,000 rpm.

Figure 3A:
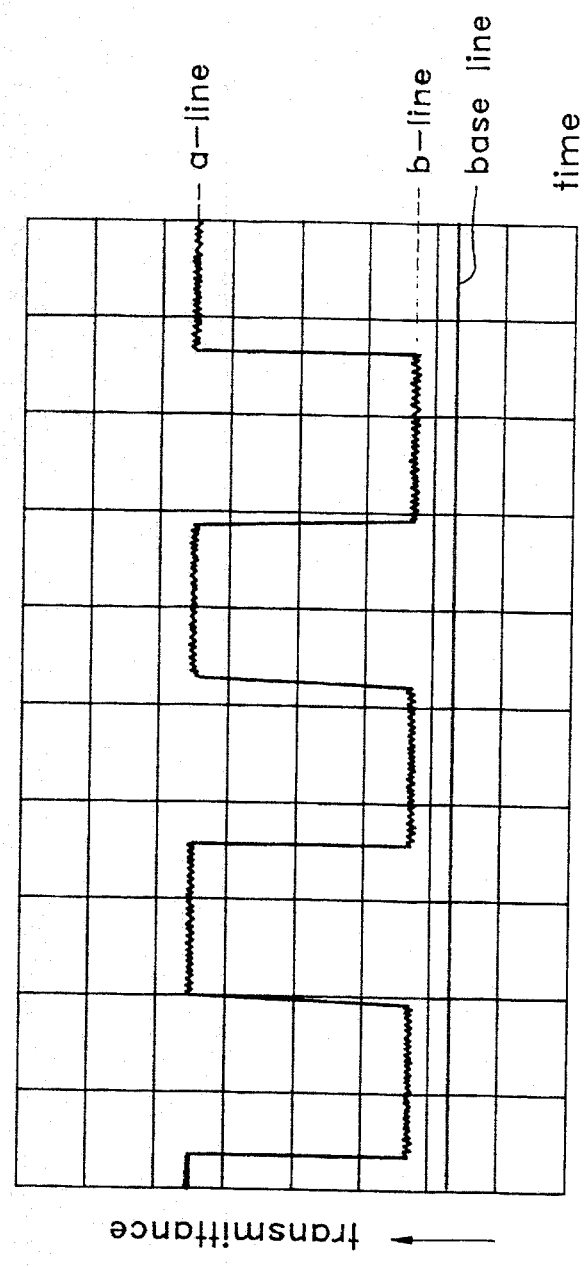
FIGS. 3A and 3B show an electro-optic characteristic of the liquid crystal display device having liquid crystalline polymer as a second coating material of the orientation layer according to an embodiment of the present invention.
Figure 3B:
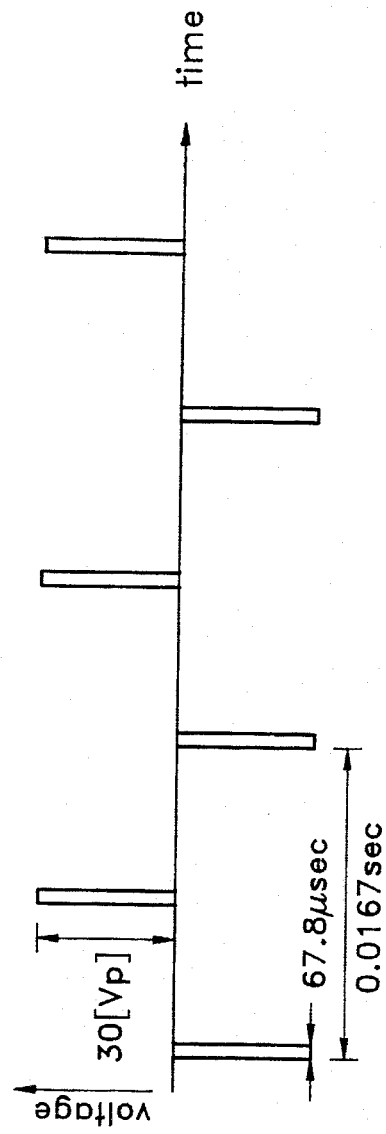

After coating, the over-coating layers were formed by evaporating the solvent in the coating layer through heating at 160° C. Then, 1.5 µm-sized spacers were deposited on one of the over-coating layers and the two substrates were joined. Ferroelectric liquid crystal (T250 manufactured by Hoechst Japan Co.) was injected into the space between the orientation layers to form a liquid crystal display device. The electro-optic characteristics of this liquid crystal display device are illustrated in FIGS. 3A and 3B.

EXAMPLE 2

Figure 5A:
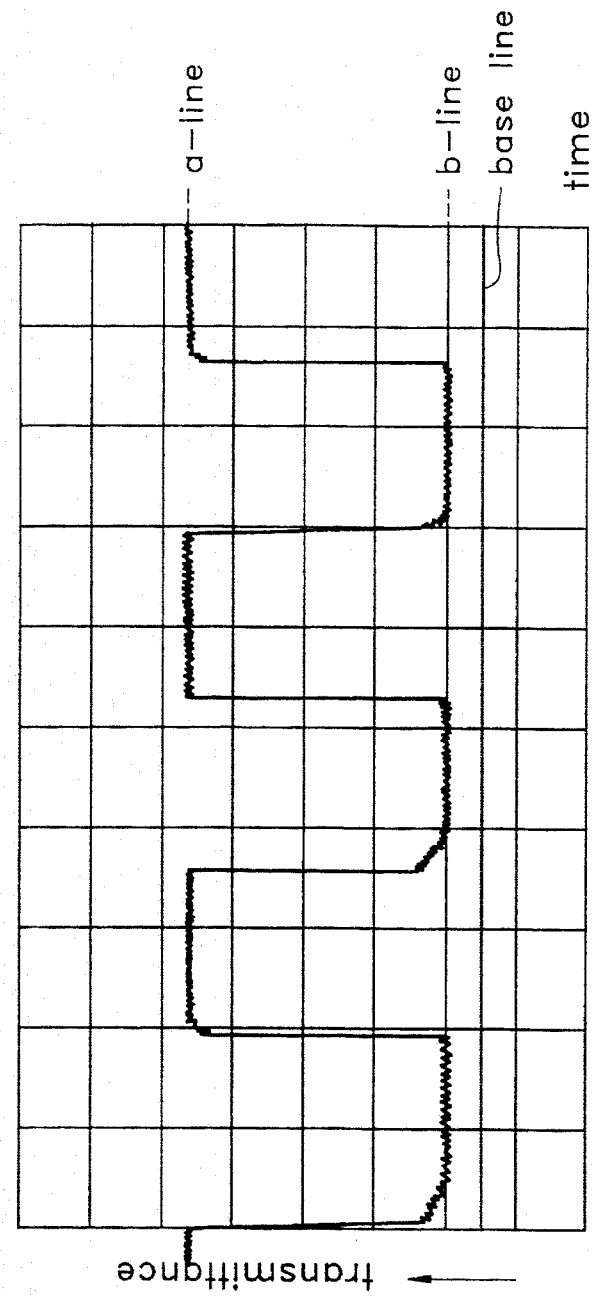
FIGS. 5A and 5B show an electro-optic characteristic of the liquid crystal display device having LPET as a second coating material of the orientation layer according to another embodiment of the present invention.
Figure 5B:
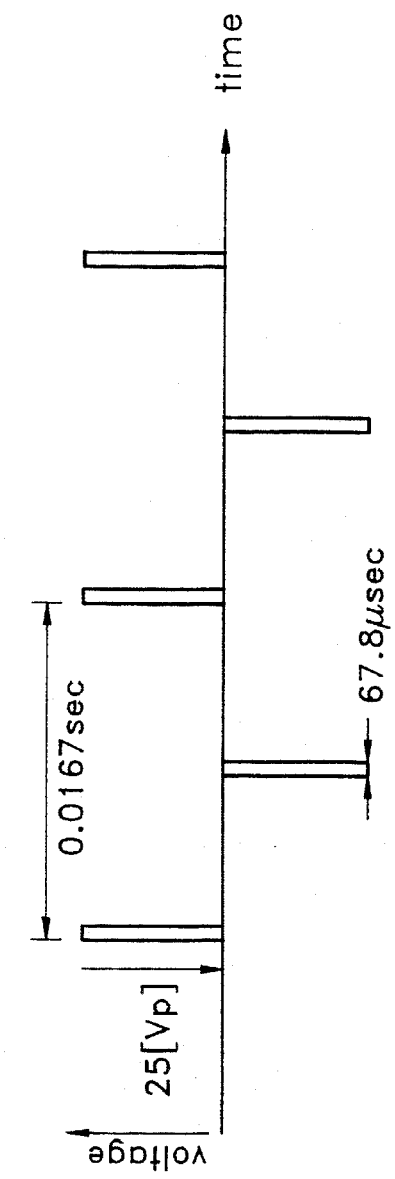

An under-coating layer was formed on the ITO coating layer according to the method of example 1. Then, A polyester polymer salt of a following structure formula (2) was dissolved in a solvent with the ratio of N-methyl pyrrolidone to butylcellosolve being 8:2 such that the amount of the solid material was 1 wt% and coated on the rubbed under-coating layer at 4,000 rpm. The coating layer was completely dried at 150° C. for 30 minutes. A liquid crystal display device was formed according to the method of example 1 and the electro-optic characteristics thereof were observed. The results are illustrated in FIGS. 5A and 5B.

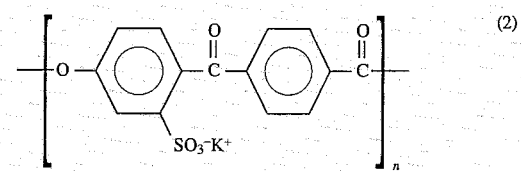

wherein n is an integer greater than three.

COMPARATIVE EXAMPLE 1

Using the polyester liquid crystalline polymer used as the over-coating layer in the example 1, single coating orientation layers were formed for comparison.

Figure 1B:
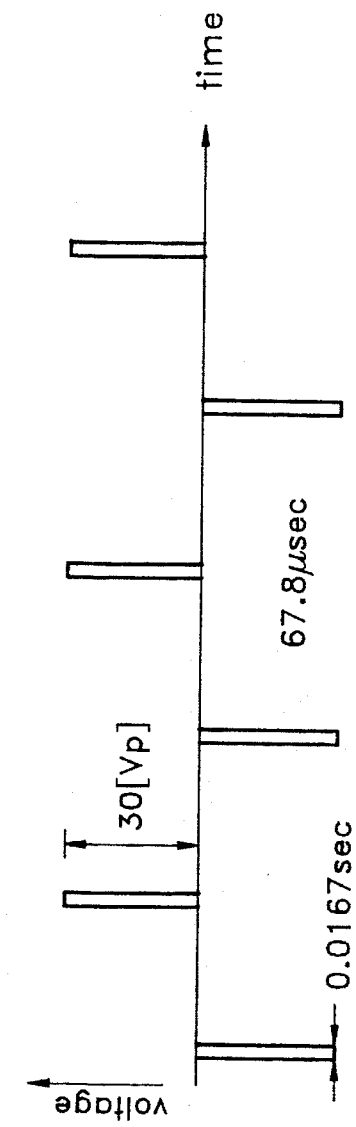

The above polyimide orientating agent (RN 305) as the under-coating orientating agent was dissolved in a solvent with the ratio of N-methyl pyrrolidone to butylcellosolve being 8:2 such that the amount of the solid material was 2 wt%. The solution was coated on the two substrates coated with transparent ITO electrodes, respectively, at 4,000 rpm. The coated layers were completely dried at 160° C. for 30 minutes. Then, the cured coating layers were rubbed using a roller wrapped with rayon while controlling the roller velocity. The liquid crystal display device was manufactured by the conventional method. The used spacers were 1.5 µm in size and the liquid crystal was the above ferroelectric liquid crystal (T250). The electro-optic characteristics of this liquid crystal display device are illustrated in FIGS. 1A and 1B.

COMPARATIVE EXAMPLE 2

Figure 2A:
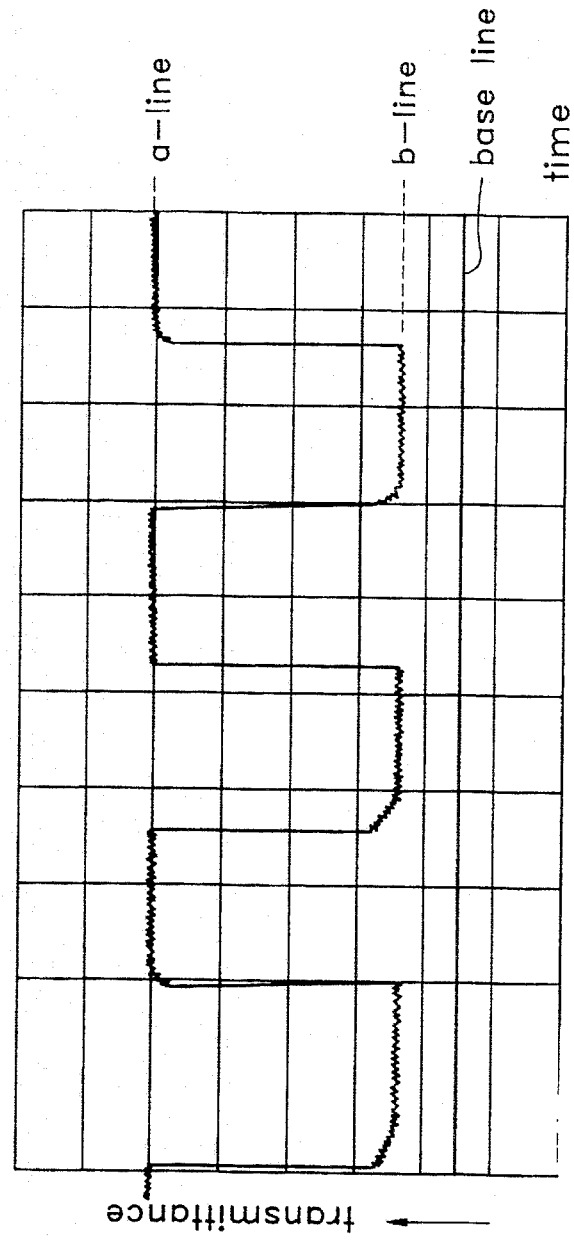
FIGS. 2A and 2B show an electro-optic characteristic of the liquid crystal display device manufactured by another conventional method.
Figure 2B:
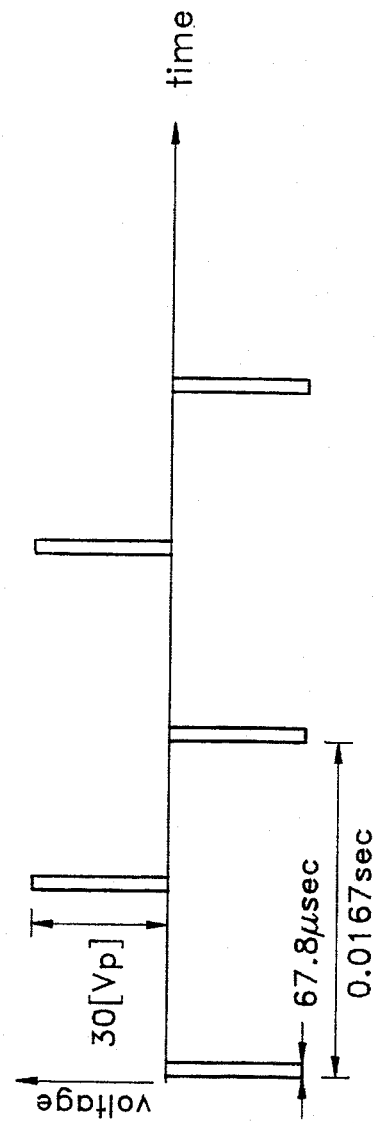

A liquid crystal display device was manufactured according to the same method as described in the comparative example 1, except that LPET (lyotropic polyester) was used as the orientating material. The results are illustrated in FIGS. 2A and 2B.

The attached drawings will be described in detail below.

In FIG. 3A, the result of the example 1, the baseline represents the light transmittance when two polarizers are vertically crossed in an polarizing microscope, and the a-line and b-line represent light transmittance at the on and off states, respectively. The contrast ratio is defined as the difference between the a-line and baseline divided by the difference between the b-line and baseline.

In FIG. 3B the pulse width of the applied voltage is 67.8 μs, the period is 0.0167 seconds and the applied voltage is 30 [Vp]. Here, it is known that the stability which is an important factor in ferroelectric liquid crystal is very good.

Figure 4:
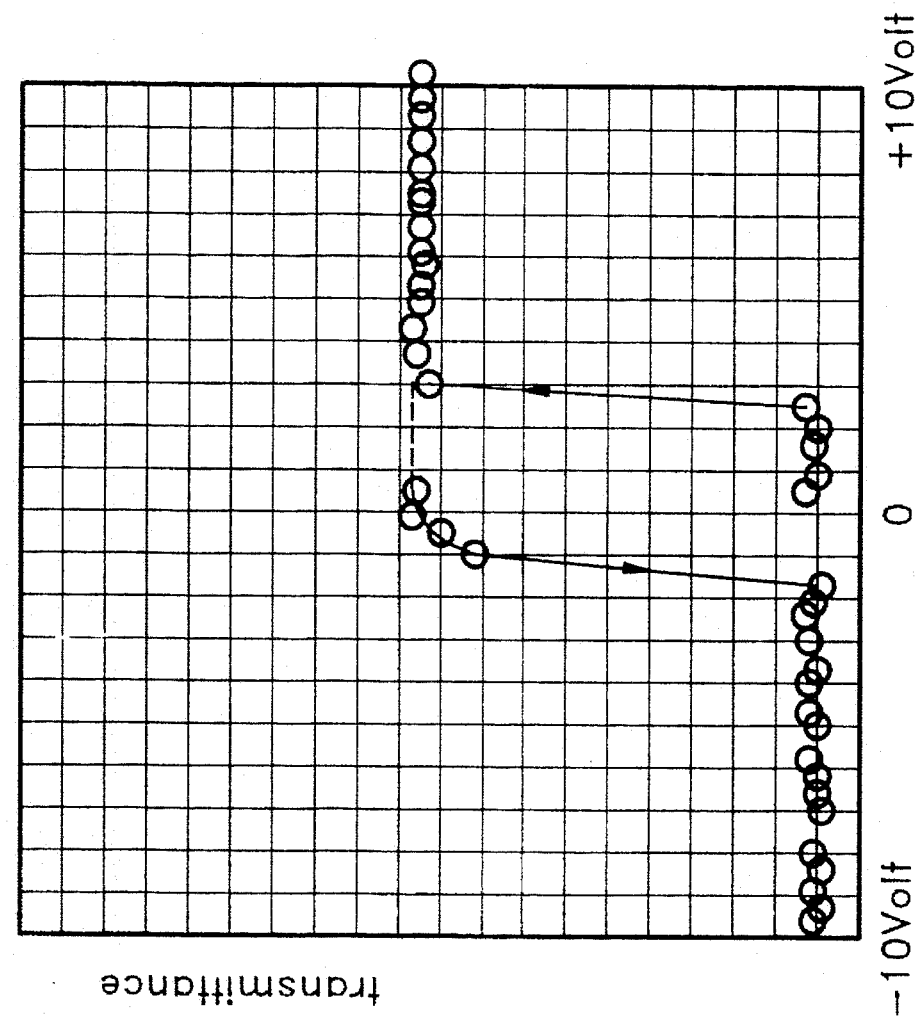
FIG. 4 illustrates light transmittance, memory characteristic and threshold voltage according to the increase and decrease of the voltage for the liquid crystal display device according to an embodiment of the present invention.

FIG. 4 illustrates light transmittance according to the increase and decrease of the voltage for the liquid crystal display device formed by the example 1, which shows typical electro-optic characteristics of the ferroelectric liquid crystal. The axis of ordinate represents light transmittance and the axis of abscissa represents applied voltage in which reset pulse is 10 [Vp; peak to peak voltage] and the voltage is increased by one volt from zero volts. Here, the minimum- and maximum points of the light transmittance represent the bistability position of the liquid crystal molecules. When the applied voltage is two to three volts, the transmittance is saturated to the maximum and this value is maintained constantly. At this state, when the applied voltage is decreased by one volt (and even at zero volts), the light transmittance shows no change owing to the memory effect. Then the liquid crystal molecules return to the minimum transmittance position at about −1.5 volts.

FIGS. 5A and 5B correspond to the result of the liquid crystal display device according to the example 2, which show good bistability of the ferroelectric liquid crystal. The applied voltage is 25 [Vp], the pulse width of the applied voltage is 67.8 μs, and the period is 0.0167 seconds.

FIG. 1A and 1B show the electro-optic characteristics of the liquid crystal display device manufactured through the comparative example 1. The result is similar to that of the liquid crystal display device having two-coating orientation layer according to the example 1. It is thought that the liquid crystalline polymer aligns more easily and uniformly than the conventional PI orientation layer by the physical rubbing.

However, in the case of using LPET as an orientation layer as in comparative example 2, the light transmittance at b-line is too high as shown in FIGS. 2A and 2B, and the overall contrast ratio is rapidly lowered.

As shown above, since the liquid crystal display device of the present invention is provided with an orientation layer of a multi-coating layer, scratches generated during rubbing can be covered. Also, since two or more different orientation materials can be employed through multi-coating, the pre-tilt angle which is dependent on the orientation layer type can be controlled, which reduces disinclination generated when voltage is applied. If the pre-tilt angle is large, fast operation even at low voltages can be obtained. This lowers threshold voltage and is advantageous in designing operation circuitry.

Moreover, in order to obtain a clear image in a device, the contrast ratio (the on/off ratio) should be large. Since the liquid crystal display device having a multi-coating orientation layer according to the present invention has an improved contrast ratio, a good image can be realized.

What is claimed is:

1. A liquid crystal display device comprising a pair of substrates, a transparent electrode disposed on each of the substrates, an orientation coating disposed on each of the transparent electrodes, and a liquid crystal material disposed between the orientation coatings, wherein the orientation coating disposed on at least one of the electrodes is a multi-layer orientation coating comprising an orientation-treated under-coating layer and an over-coating layer that is not orientation-treated disposed between the under-coating layer and the liquid crystal material.

2. A liquid crystal display device according to claim 1, wherein the orientation-treated under-coating layer comprises a compound selected from the group consisting of polyimide, polyvinyl alcohol, polyester and liquid crystalline polymer.

3. A liquid crystal display device according to claim 2, wherein the over-coating layer comprises a compound selected from the group consisting of

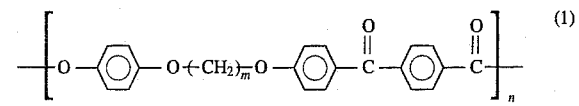

and

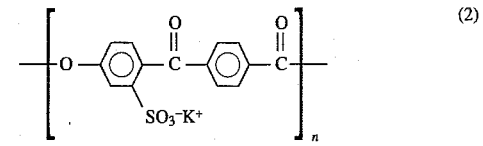

wherein m and n are integers greater than 3.

4. A liquid crystal display device according to claim 1, wherein the orientation-treated under-coating layer comprises an inorganic compound.

5. A liquid crystal display device as claimed in claim 4, wherein said inorganic compound is SiOx wherein x is 1 or 2.

6. A liquid crystal display device according to claim 4, wherein the over-coating layer comprises a compound selected from the group consisting of

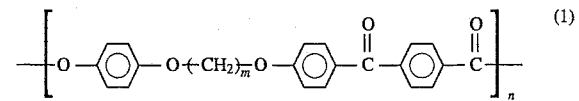

and

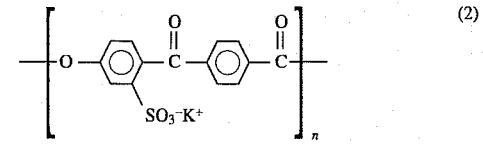

wherein m and n are integers greater than 3.

7. A liquid crystal display device as claimed in claim 1, wherein the orientation coating is comprised of a plurality of orientation-treated under-coating layers.

8. A liquid crystal display device as claimed in claim 1 wherein the over-coating layer comprises a polymer having a liquid crystalline phase.

9. A liquid crystal display device as claimed in claim 1, wherein adjacent layers of said orientation coating comprise different materials.

10. A liquid crystal display device as claimed in claim 9, wherein adjacent layers of said orientation coating dissolve in different solvents.

11. A liquid crystal display device as claimed in claim 1, wherein said liquid crystal material is selected from the group consisting of twisted nematic liquid crystal, super twisted nematic liquid crystal, ferroelectric liquid crystal and antiferroelectric liquid crystal.

12. In a liquid crystal display device including a pair of substrates, a transparent electrode disposed on each of the substrates and an orientation coating disposed each of the electrodes, the improvement comprising said orientation coating comprising an orientation-treated under-coating layer disposed on the transparent electrode and an over-coating layer that is not orientation treated disposed over said orientation-treated under-coating layer.

* * * * *